United States Patent
Lee et al.

(10) Patent No.: US 10,302,854 B2
(45) Date of Patent: May 28, 2019

(54) DISPLAY APPARATUS

(71) Applicant: Samsung Display Co., Ltd., Yongin-Si, Gyeonggi-Do (KR)

(72) Inventors: Dong-cheol Lee, Asan-si (KR); Seki Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1 day.

(21) Appl. No.: 15/221,957

(22) Filed: Jul. 28, 2016

(65) Prior Publication Data
US 2017/0052302 A1   Feb. 23, 2017

(30) Foreign Application Priority Data
Aug. 18, 2015   (KR) .......................... 10-2015-0116281

(51) Int. Cl.
*F21V 8/00*   (2006.01)

(52) U.S. Cl.
CPC ............ *G02B 6/009* (2013.01); *G02B 6/0068* (2013.01); *G02B 6/0088* (2013.01)

(58) Field of Classification Search
CPC ....... G02F 1/1336; G02F 2001/133314; G02F 2001/133317
USPC ................................................. 362/632–634
See application file for complete search history.

(56) References Cited

U.S. PATENT DOCUMENTS

| | | | |
|---|---|---|---|
| 8,502,933 B2 * | 8/2013 | Park | G02B 6/0073 362/633 |
| 8,958,022 B2 | 2/2015 | Youk et al. | |
| 8,979,294 B2 | 3/2015 | An et al. | |
| 2010/0195040 A1 * | 8/2010 | Koganezawa | G02F 1/1333 349/153 |
| 2014/0125913 A1 * | 5/2014 | Lee | G02B 6/0093 349/58 |
| 2014/0168564 A1 | 6/2014 | Lee et al. | |
| 2015/0042920 A1 * | 2/2015 | Lee | G02F 1/1336 349/60 |

FOREIGN PATENT DOCUMENTS

| | | |
|---|---|---|
| KR | 1020090061459 A | 6/2009 |
| KR | 1020140065577 A | 5/2014 |
| KR | 101420521 B1 | 7/2014 |
| KR | 1020150017444 A | 2/2015 |

* cited by examiner

*Primary Examiner* — William J Carter
(74) *Attorney, Agent, or Firm* — Cantor Colburn LLP

(57) ABSTRACT

A display apparatus includes a display panel including a display area with a curved surface, a backlight assembly which provides light to the display panel, and a bottom cover which accommodates the display panel and the backlight assembly. The bottom cover includes a bottom portion, a sidewall portion bent from a side portion of the bottom portion, and a ceiling portion bent from the sidewall portion to face the bottom portion. The backlight assembly includes a light source part disposed in an engaging space defined by the bottom portion, the sidewall portion, and the ceiling portion to emit the light, and a light guide part which guides the light emitted from the light source part to the display panel.

13 Claims, 18 Drawing Sheets

DISPLAY APPARATUS

This application claims priority to Korean Patent Application No. 10-2015-0116281, filed on Aug. 18, 2015, and all the benefits accruing therefrom under 35 U.S.C. § 119, the content of which in its entirety is herein incorporated by reference.

BACKGROUND

1. Field

The disclosure relates to a display apparatus. More particularly, the disclosure relates to a curved display apparatus.

2. Description of the Related Art

A flat panel display apparatus, such as a liquid crystal display, an organic electroluminescence display, etc., is widely applied to a variety of information processing devices, e.g., a television set, a monitor, a notebook computer, a mobile phone, etc., to display an image.

In recent years, a curved display apparatus has been developed. The curved display apparatus includes a curved display area, and thus provides a user with the image having improved three-dimensional effect, sense of immersion (or immersiveness), and presence of the image.

SUMMARY

The disclosure provides a curved display apparatus with improved assembly characteristics and improved reliability.

An embodiment of the inventive concept provides a display apparatus including a display panel with a curved surface, on which a display area is defined, a backlight assembly which provides light to the display panel, and a bottom cover which accommodates the display panel and the backlight assembly. In such an embodiment, the bottom cover includes a bottom portion, a sidewall portion bent from a side portion of the bottom portion, and a ceiling portion bent from the sidewall portion to face the bottom portion. In such an embodiment, the backlight assembly includes a light source part disposed in an engaging space defined by the bottom portion, the sidewall portion and the ceiling portion, and which emits the light, and a light guide part which guides the light emitted from the light source part to the display panel.

In an embodiment, the light guide part may include a light incident surface, to which the light is incident, at an end portion thereof, and the end portion of the light guide plate may be disposed in the engaging space.

In an embodiment, the bottom portion may include a first bottom portion spaced apart from the ceiling portion by a first distance, a second bottom portion spaced apart from an imaginary line extending from the ceiling portion by a second distance, and a third bottom portion disposed between the first bottom portion and the second bottom portion, where the first distance is equal to or greater than the second distance.

In an embodiment, the sidewall portion may be bent from a side portion of the first bottom portion to a direction substantially vertical to the first bottom portion, the ceiling portion may be bent from the sidewall portion to face the first bottom portion, and the engaging space may be defined by the first bottom portion, the sidewall portion bent and the ceiling portion.

In an embodiment, the light guide part may be disposed in the engaging space and spaced apart from the first bottom portion.

In an embodiment, the light source part may include a printed circuit board disposed on the sidewall portion to face a light incident surface of the light guide part, and a plurality of light emitting diodes disposed on the printed circuit board.

In an embodiment, the light emitting diodes may be arranged in a direction in which the light incident surface extends.

In an embodiment, the printed circuit board may have a shape curved in a direction in which the display panel is curved.

In an embodiment, the display apparatus may further includes an adhesive member disposed between the sidewall portion and the printed circuit board.

In an embodiment, each of the light emitting diodes may include a light emitting surface, from which the light is emitted, and the light emitting surface of each of the light emitting diodes are disposed to face the light incident surface.

In an embodiment, the bottom portion may have a shape curved along the curved surface of the display panel.

In an embodiment, the sidewall portion may be bent to a direction substantially vertical to the bottom portion.

In an embodiment, the ceiling portion may include a plurality of sub-ceiling portions arranged in a direction, in which a light incident surface of the light guide plate extends, to be spaced apart from each other.

In an embodiment, the printed circuit board may include a plurality of protrusion portions, and each of the protrusion portions may be disposed in a space between the sub-ceiling portions.

In an embodiment, the protrusion portions may include a first portion disposed in the space between the sub-ceiling portions, and a second portion extending from the first portion to the extension direction of the light incident surface and disposed on the sub-ceiling portions.

According to embodiments described herein, the light source part and the light guide part are disposed in and disposed in the engaging space defined at the one side portion of the bottom cover, and thus the light source part and the light guide part may be easily aligned with each other.

BRIEF DESCRIPTION OF THE DRAWINGS

The above and other feature of embodiments of the disclosure will become readily apparent by reference to the following detailed description when considered in conjunction with the accompanying drawings, in which.

DETAILED DESCRIPTION

Figure 1:
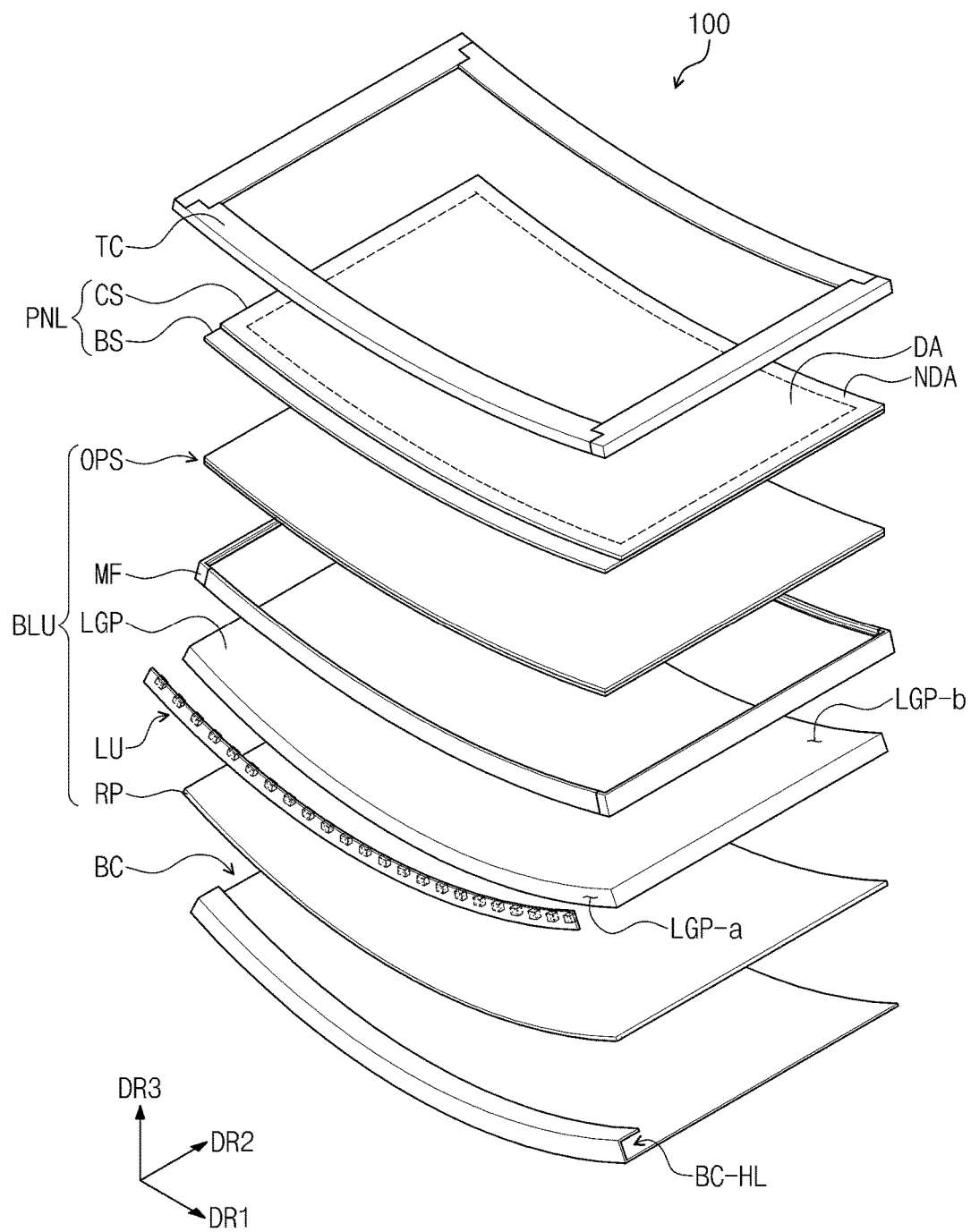
FIG. 1 is an exploded perspective view showing a display apparatus according to an exemplary embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. "Or" means "and/or." As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

FIG. 1 is an exploded perspective view showing a display apparatus 100 according to an exemplary embodiment of the disclosure.

Referring to FIG. 1, an exemplary embodiment of the display apparatus 100 includes a display panel PNL having a display area with a curved surface, a backlight assembly BLU that provides light to the display panel PNL, and a bottom cover BC that accommodates the display panel PNL and the backlight assembly BLU. In such an embodiment, the display apparatus 100 may further include a top cover TC.

For the convenience of description, a direction to which the image from the display apparatus 100 is provided is referred to as an upward direction and a direction opposite to the upward direction is referred to as a downward direction, but they should not be limited thereto or thereby.

The display apparatus 100, as shown in FIG. 1, may have a curved shape. In one exemplary embodiment, for example, the display apparatus 100 may have the shape curved in a first direction DR1.

In an exemplary embodiment, the display apparatus 100 is curved to be concave in the upward direction and to be convex in the downward direction.

However, the curved shape of the display apparatus 100 should not be limited to the above-mentioned shape. In an alternative exemplary embodiment, the display apparatus 100 may be curved to be convex in the upward direction and to be concave in the downward direction.

The display panel PNL of the display apparatus 100 may have a substantially rectangular plate shape with two pair of sides, each pair has adjacent sides that are equal in length, and angles are equal where the pairs meet. One pair of the two pairs of the sides may have a length longer than the other pair of the two pairs of the sides. In an exemplary embodiment, as shown in FIG. 1, the display panel PNL has substantially the rectangular shape defined by one pair of long sides and one pair of short sides. In an exemplary embodiment, a direction in which the long sides extend is referred to as the first direction DR1 and a direction in which the short sides extend is referred to as a second direction DR2.

The display panel PNL may have flexibility. In one exemplary embodiment, for example, the display panel PNL may be provided in a flat shape or a curved shape, which is initially given shape, but the display panel PNL may be provided in a shape different from the initial shape of the display panel PNL.

The display panel PNL may be curved in various ways. In one exemplary embodiment, for example, the display panel PNL may be curved to be convex in the downward direction or the upward direction, but not being limited thereto or thereby.

In an exemplary embodiment, the display panel PNL may be provided in the curved shape, which is initially given shape, to have rigidity without having flexibility. In such an embodiment, the display panel PNL may be provided to be convex in the downward direction or the upward direction after being fixed in the curved shape.

In an exemplary embodiment, as shown in FIG. 1, the display panel PNL has the shape curved in the first direction DR1. Accordingly, the long sides of the display panel PNL are curved in the first direction DR1 and the short sides of the display panel PNL have a straight line shape in the second direction DR2 substantially perpendicular to the first direction DR1.

The display panel PNL includes a display area DA for displaying the image and a non-display area NDA provided adjacent to at least one side portion of the display area DA and disposed outside the display area DA. The display area DA of the display panel PNL has a curved surface shape.

An edge of the display panel PNL is covered by the top cover TC. In one exemplary embodiment, for example, the non-display area NDA of the display panel PNL is covered by the top cover TC.

The display panel PNL may be, but not limited to, a liquid crystal display panel and may display the image using the light provided from the backlight assembly BLU. However, various display panels, such as a nano-crystal display panel, an electrophoretic display panel, an electrowetting display panel, etc., may be used as the display panel PNL according to embodiments.

Hereinafter, for convenience of description, an exemplary embodiment where the display panel PNL is the liquid crystal display panel will be described in detail.

In such an embodiment, the display panel PNL includes a base substrate BS, an opposite substrate CS disposed to face the base substrate BS, and a liquid crystal layer (not shown) interposed between the base substrate BS and the opposite substrate CS.

The base substrate BS of the display panel PNL includes a plurality of pixel electrodes (not shown) and a plurality of thin film transistors (not shown) electrically connected to the pixel electrodes in a one-to-one correspondence. Each thin film transistor switches a driving signal applied to a corresponding pixel electrode among the pixel electrodes. In such an embodiment, the opposite substrate CS includes a common electrode (not shown) that generates an electric field with the pixel electrodes to control an arrangement of liquid crystal molecules of the liquid crystal layer and a color filter (not shown). The common electrode generates the electric field together with the pixel electrodes, which operates on the liquid crystal layer, and the color filter filters the light provided from the backlight assembly BLU to allow the light to be converted to a color light.

However, the base substrate BS and the opposite substrate CS should not be limited to the above-mentioned structure. In an alternative exemplary embodiment, the color filter and the common electrode may be disposed on the base substrate BS rather than the opposite substrate CS.

In an exemplary embodiment, the display apparatus 100, as shown in FIG. 1, includes the backlight assembly BLU disposed under the display panel PNL. The backlight assembly BLU provides the display panel PNL with the light.

In such an embodiment, the backlight assembly BLU includes a light source part LU that emits the light and a light guide part LGP that guides the light emitted from the light source part LU to the display panel PNL.

The light source part LU is disposed adjacent to one side portion of the light guide part LGP. The light guide part LGP includes a light incident surface LGP-a to which the light emitted from the light source part LU is incident and a light exit surface LGP-b from which the light incident to the light guide part LGP exits to the display panel PNL.

Referring to FIG. 1, in an exemplary embodiment, the backlight assembly BLU may further include a reflective layer or part RP and optical sheets OPS. In such an embodiment, the backlight assembly BLU may further include a mold frame MF that supports the display panel PNL and the optical sheets OPS.

The bottom cover BC is disposed under the backlight assembly BLU. The bottom cover BC accommodates the display panel PNL and the backlight assembly BLU.

The bottom cover BC may include or be formed of a metal material including stainless steel ("SUS"), galvalume, or aluminum, or a plastic material.

Figure 2A:
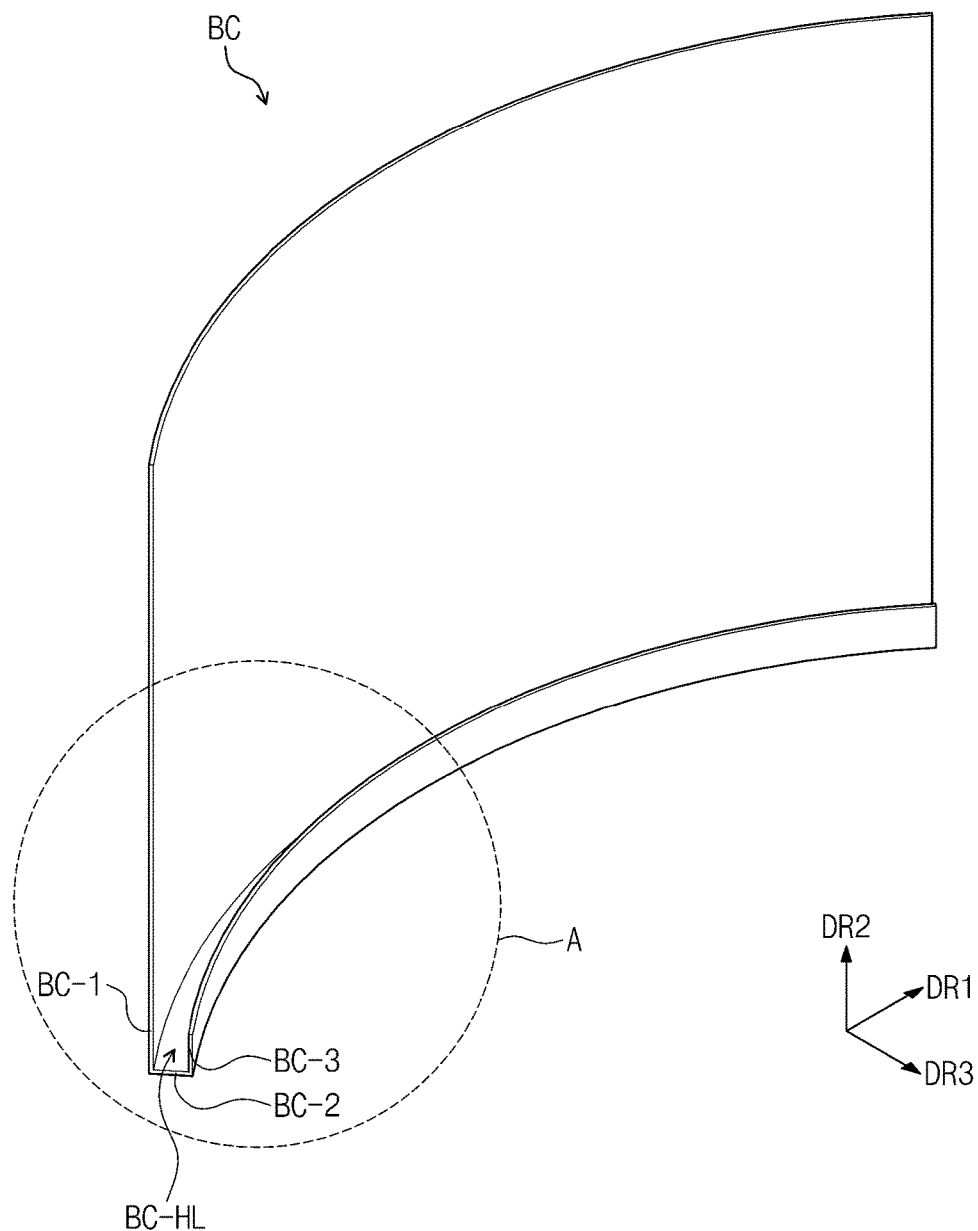
FIGS. 2A to 2C are perspective views showing a bottom cover included in a display apparatus according to an exemplary embodiment of the disclosure.
Figure 2B:
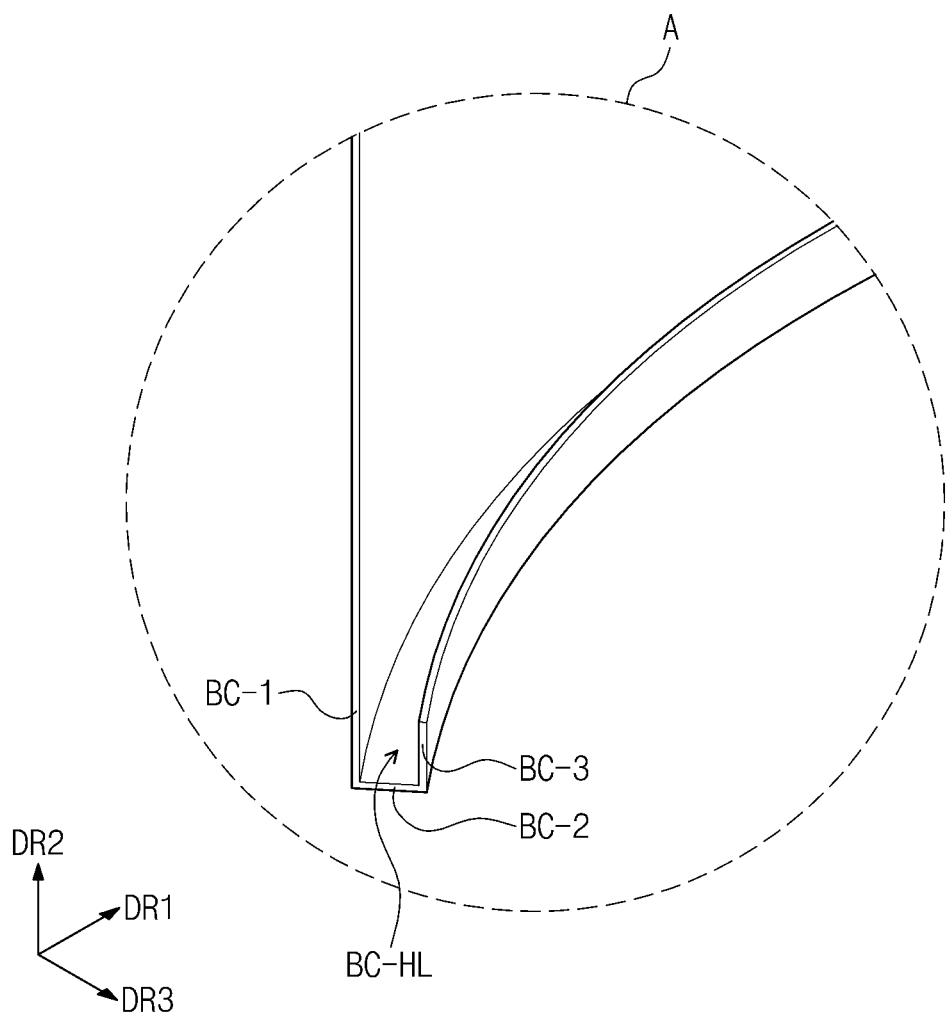

FIG. 2A is a perspective view showing the bottom cover BC included in the display apparatus 100, and FIG. 2B is an enlarged perspective view of the portion "A" of FIG. 2A corresponding to one side edge of the bottom cover BC.

Referring to FIGS. 2A and 2B, in an exemplary embodiment, the bottom cover BC includes a bottom portion BC-1, a sidewall portion BC-2 bent from one end of the bottom portion BC-1, and a ceiling portion BC-3 bent from the sidewall portion BC-2.

The bottom portion BC-1 of the bottom cover BC is curved in the first direction DR1. In such an embodiment, the bottom portion BC-1 of the bottom cover BC is curved in the same direction as the direction in which the display panel is curved.

In an exemplary embodiment, the bottom cover BC includes an engaging space BC-HL defined by the bottom portion BC-1, the sidewall portion BC-2, and the ceiling portion BC-3.

In an exemplary embodiment, as shown in FIGS. 2A and 2B, the bottom cover BC includes the engaging space BC-HL at one end portion thereof. The engaging space BC-HL of the bottom cover BC is surrounded by the bottom portion BC-1 corresponding to one end of the bottom cover BC, the sidewall portion BC-2 extending from the bottom portion BC-1 and bent from the bottom portion BC-1 to a direction substantially vertical to the bottom portion, and the ceiling portion BC-3 extending from the sidewall portion BC-2 and bent from the sidewall portion BC-2 to a direction substantially vertical to the sidewall portion BC-2 to face the bottom portion BC-1.

Referring to FIG. 2A, the engaging space BC-HL is defined at one side of the bottom cover BC, which extends in the first direction DR1 among four sides of the bottom cover BC. Therefore, the engaging space BC-HL of the bottom cover BC is defined to have a shape extending in the first direction DR1.

Although not shown in figures, the other sides of the bottom cover BC, at which the engaging space BC-HL is not defined, may further include a sidewall portion bent from the bottom portion BC-1 to the direction substantially vertical to the bottom portion BC-1.

Referring to FIG. 2B, the sidewall portion BC-2 is substantially vertical to the bottom portion BC-1, and the ceiling portion BC-3 is substantially vertical to the sidewall portion BC-2. The bottom portion BC-1 and the ceiling portion BC-3, which face each other, are disposed to be substantially parallel to each other. In one exemplary embodiment, for example, the bottom portion BC-1 and the ceiling portion BC-3 may be surfaces disposed to be substantially parallel to each other in FIG. 2B. The engaging space BC-HL may have a staple shape ([) defined by the bottom portion BC-1, the sidewall portion BC-2, and the ceiling portion BC-3 in a cross-section thereof.

Figure 2C:
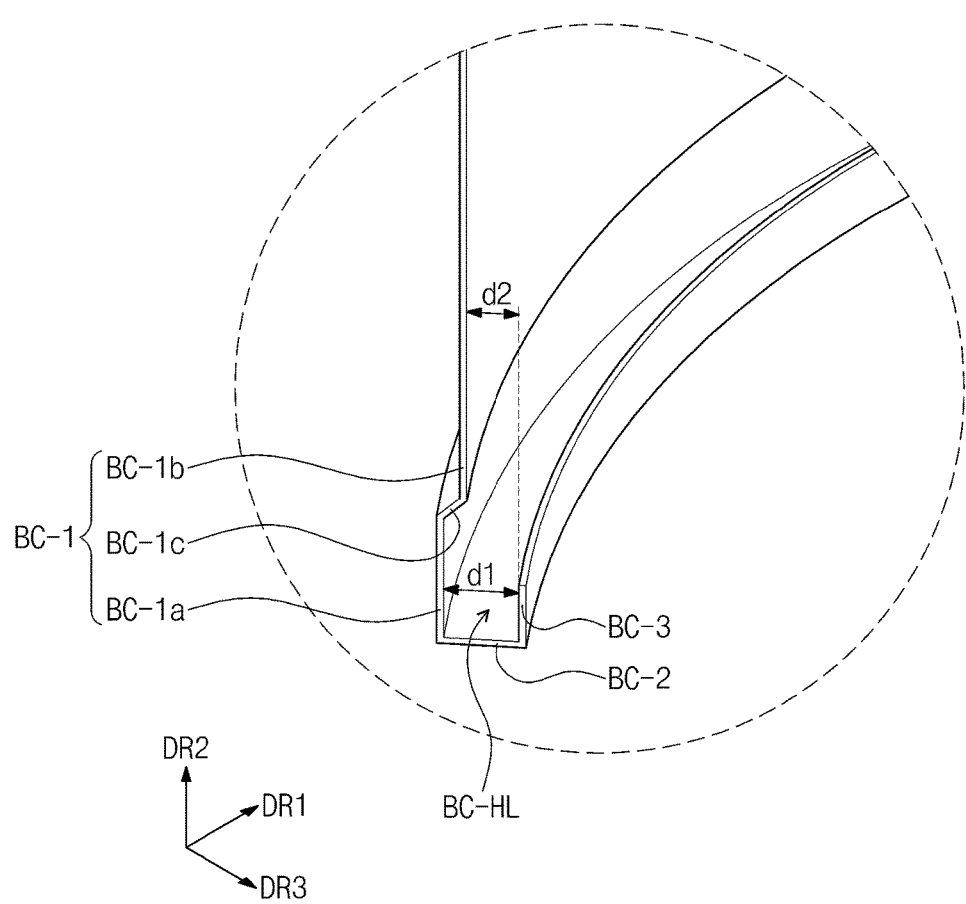

FIG. 2C is a perspective view showing a bottom cover BC according to an alternative exemplary embodiment. FIG. 2C shows a portion of the bottom cover BC, in which an engaging space BC-HL is defined.

Referring to FIG. 2C, in an exemplary embodiment, the bottom cover BC includes a bottom portion BC-1, a sidewall portion BC-2, and a ceiling portion BC-3.

In such an embodiment, as shown in FIG. 2C, the bottom portion BC-1 includes a first bottom portion BC-1a spaced apart from the ceiling portion BC-3 by a first distance d1, a second bottom portion BC-1b spaced apart from an imaginary surface extending from the ceiling portion BC-3 by a second distance d2, and a third bottom portion BC-1c disposed or connected between the first and second bottom portions BC-1a and BC-1b.

In an exemplary embodiment, the first distance d1 is equal to or greater than the second distance d2.

In one exemplary embodiment, for example, the bottom portion BC-1 shown in FIG. 2C includes the first bottom portion BC-1a, the second bottom portion BC-1b having a step difference with respect to the first bottom portion BC-1a, and the third bottom portion BC-1c connecting the first and second bottom portions BC-1a and BC-1b.

In an exemplary embodiment, as shown in FIG. 2C, the engaging space BC-HL corresponds to a space defined by the first bottom portion BC-1a of the bottom portion BC-1, the sidewall portion BC-2, and the ceiling portion BC-3. In such an embodiment, the engaging space BC-HL has a shape extending in the first direction DR1 as shown in FIG. 2C.

Figure 3A:
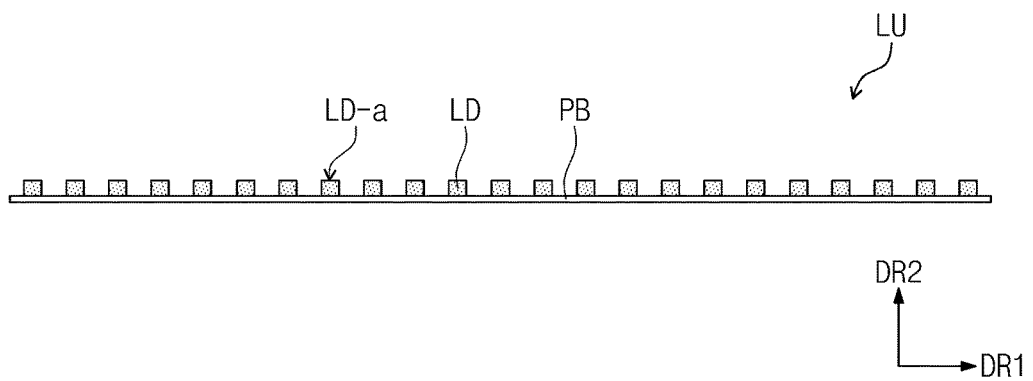
FIG. 3A is a cross-sectional view showing a light source part according to an exemplary embodiment of the disclosure.
Figure 3B:
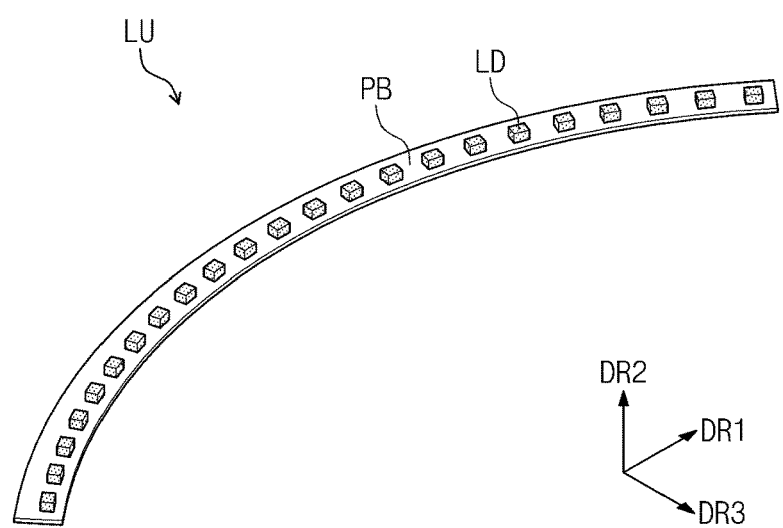
FIG. 3B is a perspective view showing a light source part according to an exemplary embodiment of the disclosure.

FIG. 3A is a cross-sectional view showing a light source part LU according to an exemplary embodiment of the disclosure, and FIG. 3B is a perspective view showing a light source part LU according to an exemplary embodiment of the disclosure.

In an exemplary embodiment, the light source part LU includes a printed circuit board PB and a plurality of light emitting diodes LD on the printed circuit board PB.

The light emitting diodes LD may be mounted on the printed circuit board PB, and the printed circuit board PB may apply a power source voltage to the light emitting diodes LD. In an exemplary embodiment, the printed circuit board PB may apply a dimming signal and a driving voltage to the light emitting diodes LD thereon.

The printed circuit board PB may include—at least one insulating layer (not shown) and at least one circuit layer (not shown). The printed circuit board PB may be, but not limited to, a metal core printed circuit board ("MCPCB").

Referring to FIGS. 3A and 3B, in an exemplary embodiment, the printed circuit board PB extends in a first direction DR1. In such an embodiment, the printed circuit board PB is curved in the first direction DR1. In one exemplary embodiment, for example, the printed circuit board PB is curved in the same direction as the direction in which the display panel PNL is curved. In such an embodiment, the printed circuit board PB is curved in the same direction as in which the direction the bottom portion of the bottom cover is curved.

Each of the light emitting diodes LD on the printed circuit board PB may be a light emitting diode package.

The light emitting diodes LD are arranged in the direction in which the printed circuit board PB is curved. In an exemplary embodiment, the light emitting diodes LD are arranged in the first direction DR1 and spaced apart from each other.

Each light emitting diode LD includes a light exit surface LD-a facing a light incident surface of the light guide part described below.

Figure 4:
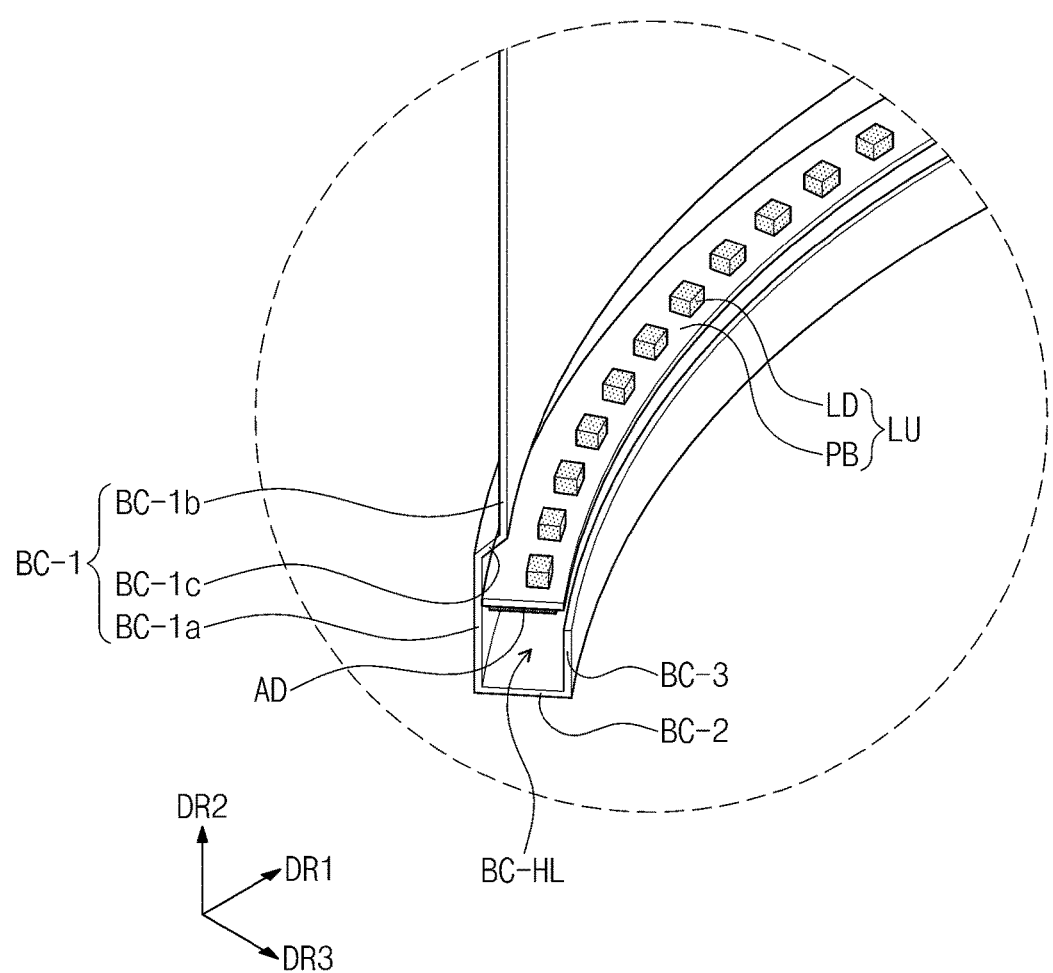
FIG. 4 is a partially enlarged view showing an arrangement relation between a bottom cover and a light source part according to an exemplary embodiment of the disclosure.

In one exemplary embodiment, for example, the light emitting diodes emit the light to a second direction DR2 and the light exit surface LD-a of the light emitting diode may be substantially parallel to one surface of the printed circuit board on which the light emitting diodes are mounted. In such an embodiment, the light emitting diodes may be top view type light emitting diodes that emit the light to an upper direction thereof. FIG. 4 is a partially enlarged view showing an arrangement relation between the bottom cover BC and the light source part LU according to an exemplary embodiment of the disclosure.

Referring to FIG. 4, in an exemplary embodiment, the light source part LU is disposed in the engaging space BC-HL of the bottom cover BC. In such an embodiment, the light source part LU may be disposed in, e.g., inserted into and fixed to, the engaging space BC-HL of the bottom cover BC.

The printed circuit board PB of the light source part LU is disposed to face the sidewall portion BC-2 of the bottom cover BC. In one exemplary embodiment, for example, the printed circuit board PB of the light source part LU includes a surface on which the light emitting diodes LD are mounted and a rear surface facing the surface, and the printed circuit board PB is disposed to allow the rear surface of the printed circuit board PB to face the sidewall portion BC-2 of the bottom cover BC. In an exemplary embodiment, an adhesive member AD may be further disposed between the printed circuit board PB and the sidewall portion BC-2.

In an exemplary embodiment, the adhesive member AD may be, but not limited to, a double-coated tape and used to fix the printed circuit board PB to the sidewall portion BC-2.

In such an embodiment, the adhesive member AD may have a heat conductivity to easily discharge heat generated by the light source part LU.

Figure 5:
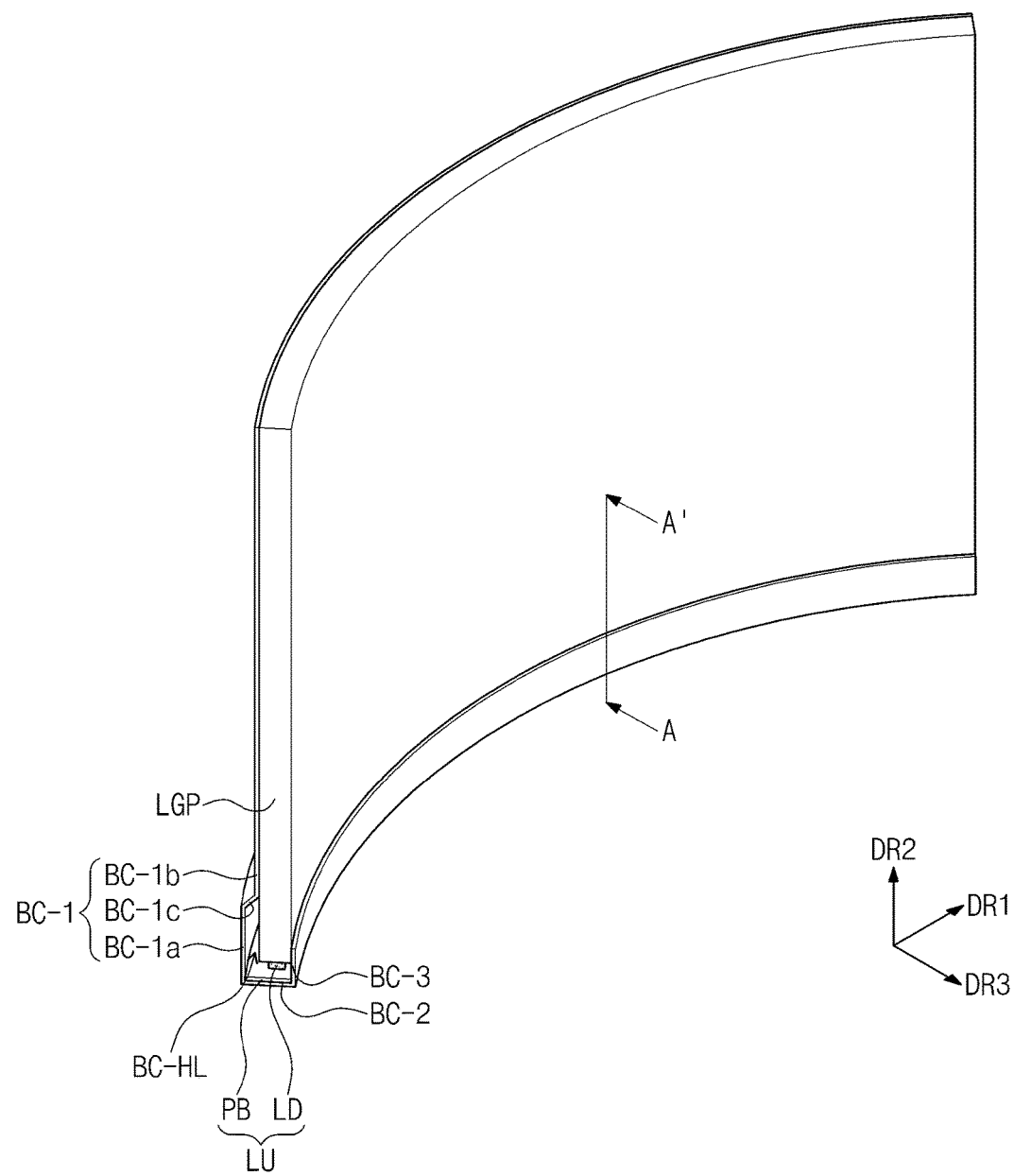
FIG. 5 is a perspective view showing a bottom cover in which a light source part and a light guide part are accommodated according to an exemplary embodiment of the disclosure.
Figure 6:
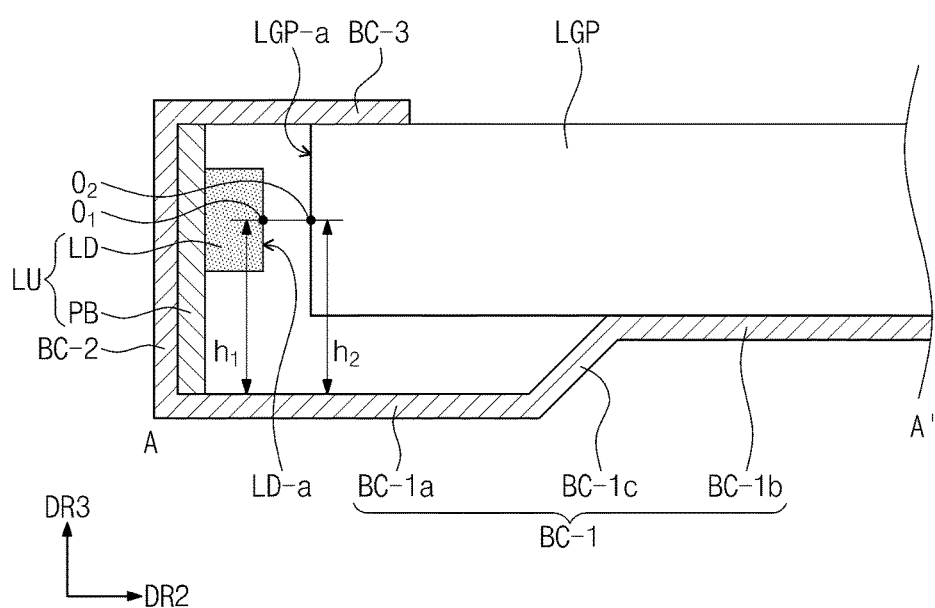
FIG. 6 is across-sectional view taken along line A-A' of FIG. 5.

FIG. 5 is a perspective view showing a bottom cover in which a light source part and a light guide part are accommodated according to an exemplary embodiment of the disclosure, and FIG. 6 is a cross-sectional view taken along line A-A' of FIG. 5.

Referring to FIG. 5, in an exemplary embodiment, one end portion of the light guide part LGP is disposed in, e.g., inserted into, the engaging space BC-HL of the bottom cover. In such an embodiment, the one end portion of the light guide part LGP, which includes the light incident surface of the light guide part LGP, may be disposed in, e.g., inserted into, the engaging space of the bottom cover and fixed to the bottom cover.

Referring to FIGS. 5 and 6, in an exemplary embodiment, the light source part LU is disposed in the engaging space BC-HL of the bottom cover such that the light emitting diodes LD of the light source part to face the light incident surface LGP-a of the light guide part.

In an exemplary embodiment, the light incident surface LGP-a of the light guide part LGP are disposed adjacent to the light emitting diodes LD and the light emitted from the light emitting diodes LD is incident to the light guide part LGP through the light incident surface LGP-a of the light guide part LGP. The light incident to the light guide part LGP is guided to the display panel.

In an exemplary embodiment, the light incident surface LGP-a of the light guide part LGP extends in the first direction DR1. In such an embodiment, the light guide part LGP may be curved to correspond to the curved shape of the display panel after being inserted into the engaging space BC-HL of the bottom cover. The light guide part LGP and the light source part LU are disposed in the engaging space BC-HL of the bottom cover, and the curved shape of the light guide part LGP is maintained by the bottom cover.

In such an embodiment, since the light source part and the light guide part are disposed in and fixed to the engaging space, a light emitting surface of the light source part may be easily aligned with the light incident surface of the light guide part. In such an embodiment, the light source part and the light guide part may be effectively prevented from being dislocated to each other while being assembled with each other and being used.

Referring to FIGS. 5 and 6, the light emitting diodes are disposed in a way such that the light emitting surface LD-a of the light emitting diodes face the light incident surface LGP-a of the light guide part LGP.

In an exemplary embodiment, a center portion $O_1$ of the light emitting surface of the light emitting diode and a center portion $O_2$ of the light incident surface LGP-a of the light guide part LGP, which faces the light emitting surface of the light emitting diode, are placed at the same height from the bottom portion BC-1 of the bottom cover. In one exemplary embodiment, for example, a distance h1 between the first bottom portion BC-1a defining the engaging space BC-HL of the bottom cover and the center portion $O_1$ of the light emitting surface of the light emitting diode may be substantially equal to a distance h2 between the first bottom portion BC-1a and the center portion $O_2$ of the light incident surface of the light guide part LGP.

In an exemplary embodiment, referring to FIG. 6, the light emitting diodes are disposed on the printed circuit board PB to be closer to the ceiling portion BC-3 than the bottom portion BC-1. In one exemplary embodiment, for example, a distance between the first bottom portion BC-1a and the center portion $O_1$ of the light emitting surface of the light emitting diode is greater than a distance between the center portion $O_1$ of the light emitting surface of the light emitting diode and the ceiling portion BC-3. In such an embodiment, the printed circuit board of the light source part may include a line part disposed at one side portion thereof adjacent to the bottom portion of the bottom cover.

Figure 7A:
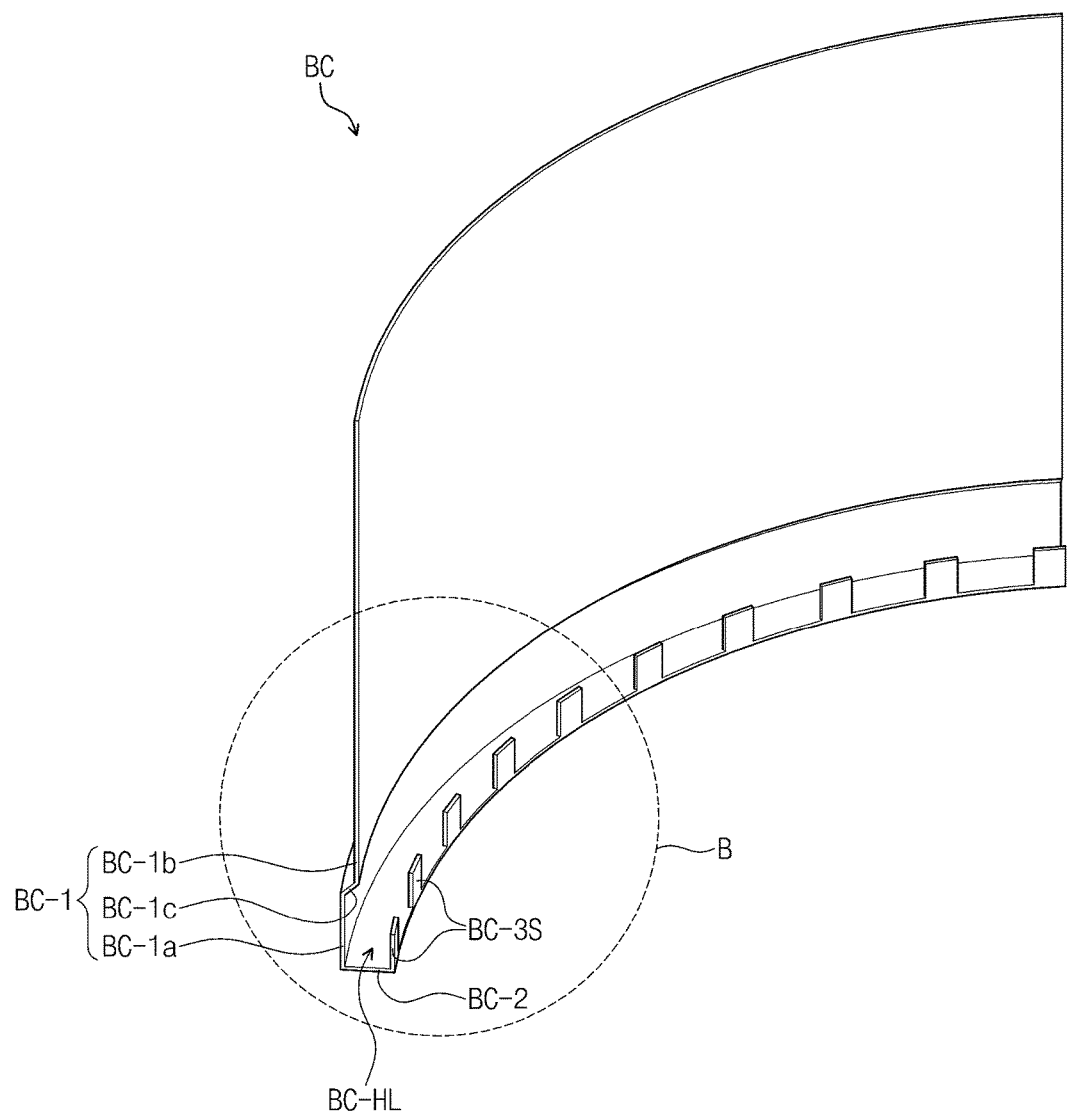
FIGS. 7A and 7B are perspective views showing a bottom cover included in a display device according to an alternative exemplary embodiment of the disclosure.
Figure 7B:
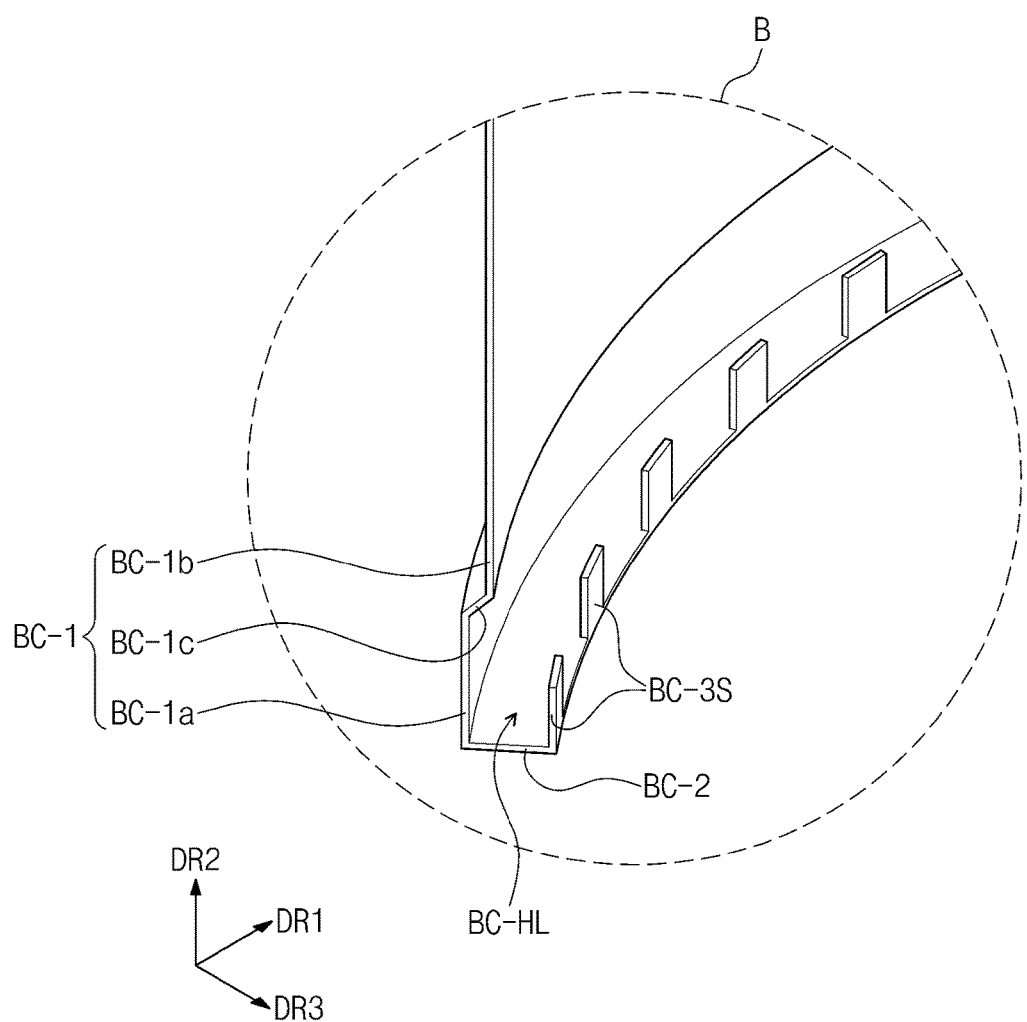

FIGS. 7A and 7B are perspective views showing a bottom cover included in a display device according to an alternative exemplary embodiment of the disclosure. In detail, FIG. 7A is a perspective view showing a bottom cover BC, and FIG. 7B is an enlarged view of a portion "B" of FIG. 7A.

Referring to FIGS. 7A and 7B, in an exemplary embodiment, the bottom cover BC includes an engaging spaced BC-HL defined at one side portion thereof, and the engaging space BC-HL is defined by a bottom portion BC-1, a sidewall portion BC-2, and a plurality of sub-ceiling portions BC-3S. In such an embodiment, the sub-ceiling portions BC-3S collectively define the ceiling portion of the bottom cover BC.

In an exemplary embodiment, the sub-ceiling portions BC-3S are spaced apart from each other and bent from the sidewall portion BC-2 of the bottom cover to face the bottom portion BC-1.

The bottom portion of the bottom cover shown in FIG. 7A may have substantially the same shape as the bottom portion having the step difference shown in FIG. 2C. In such an embodiment, as shown in FIG. 7A, the bottom portion of the bottom cover shown includes a first bottom portion BC-1a, a third bottom portion BC-1c corresponding to a stepped portion, and a second bottom portion BC-1b extending from the third bottom portion BC-1c and having a step difference with respect to the first bottom portion BC-1a.

Alternatively, although not shown in figures, the bottom cover may include an engaging space defined by a bottom portion not having the stepped portion as shown in FIG. 2A, a sidewall portion, and a plurality of sub-ceiling portions.

As shown in FIGS. 7A and 7B, the sub-ceiling portions BC-3S are arranged in the first direction DR1 and spaced apart from each other. In such an embodiment, the first direction DR1 may correspond to the direction in which the light incident surface of the light guide part extends and the sub-ceiling portions BC-3S are arranged in the direction, in which the light incident surface of the light guide part extends, and spaced apart from each other.

Figure 8A:
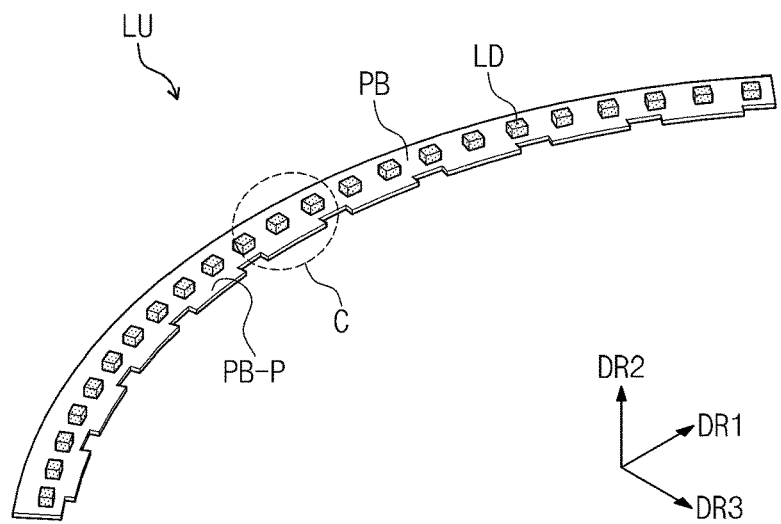
FIGS. 8A and 8B are a perspective view and a partially enlarged view, respectively, showing a light source part according to an alternative exemplary embodiment of the disclosure.

FIG. 8A is a perspective view showing a light source part LU according to an alternative exemplary embodiment of the disclosure. In an exemplary embodiment, as shown in FIG. 8A, the light source part LU includes a printed circuit board PB and a plurality of light emitting diodes LD mounted on the printed circuit board PB. The light emitting diodes LD may be arranged in a first direction DR1 and spaced apart from each other.

Referring to FIG. 8A, in an exemplary embodiment, the printed circuit board PB includes a plurality of protrusion portions PB-P disposed at one end of the printed circuit board PB. The protrusion portions PB-P are protruded to a third direction DR3 from the one end of the printed circuit board PB. The protrusion portions PB-P may be integrally formed with the printed circuit board PB as a single unitary and indivisible unit.

Figure 8B:
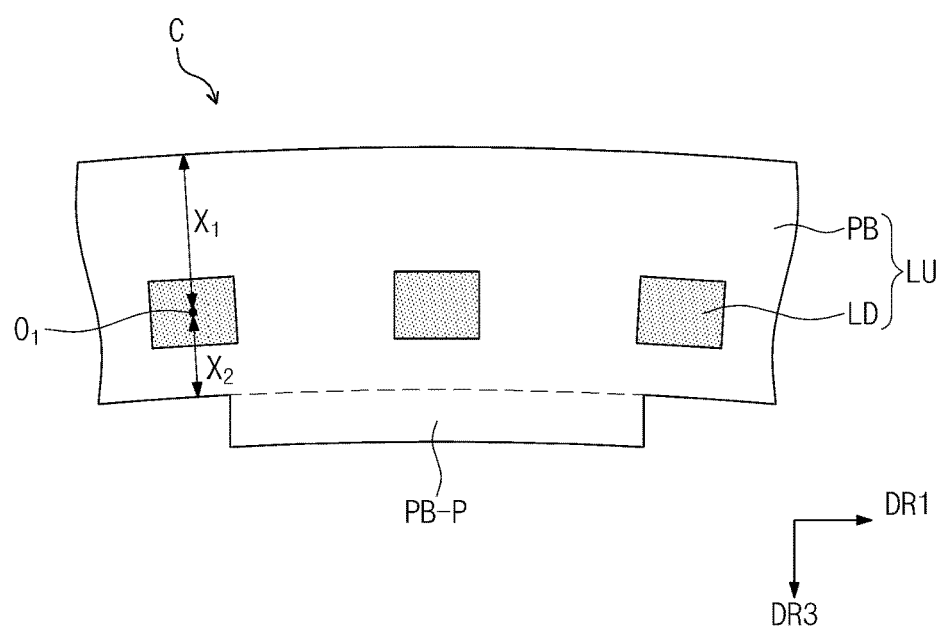

FIG. 8B is a partially enlarged plan view showing a portion "C" of the light source part LU shown in FIG. 8A. Referring to FIG. 8B, in an exemplary embodiment, the light emitting diodes LD are disposed on the printed circuit board PB to be closer to the one end of the printed circuit board PB.

In one exemplary embodiment, for example, when a distance between the other end of the printed circuit board PB and a center portion $O_1$ of the light emitting surface of the light emitting diode is referred to as "x1" and a distance between the one end of the printed circuit board PB, at which the protrusion portions PB-P are disposed, and the light emitting diode is referred to as "x2", the distance x1 is greater than the distance x2 (x1>x2). In such an embodiment, the printed circuit board of the light source part may include a line part (not shown) disposed at the one end of the printed circuit board, at which the protrusion portions are not disposed.

Figure 9:
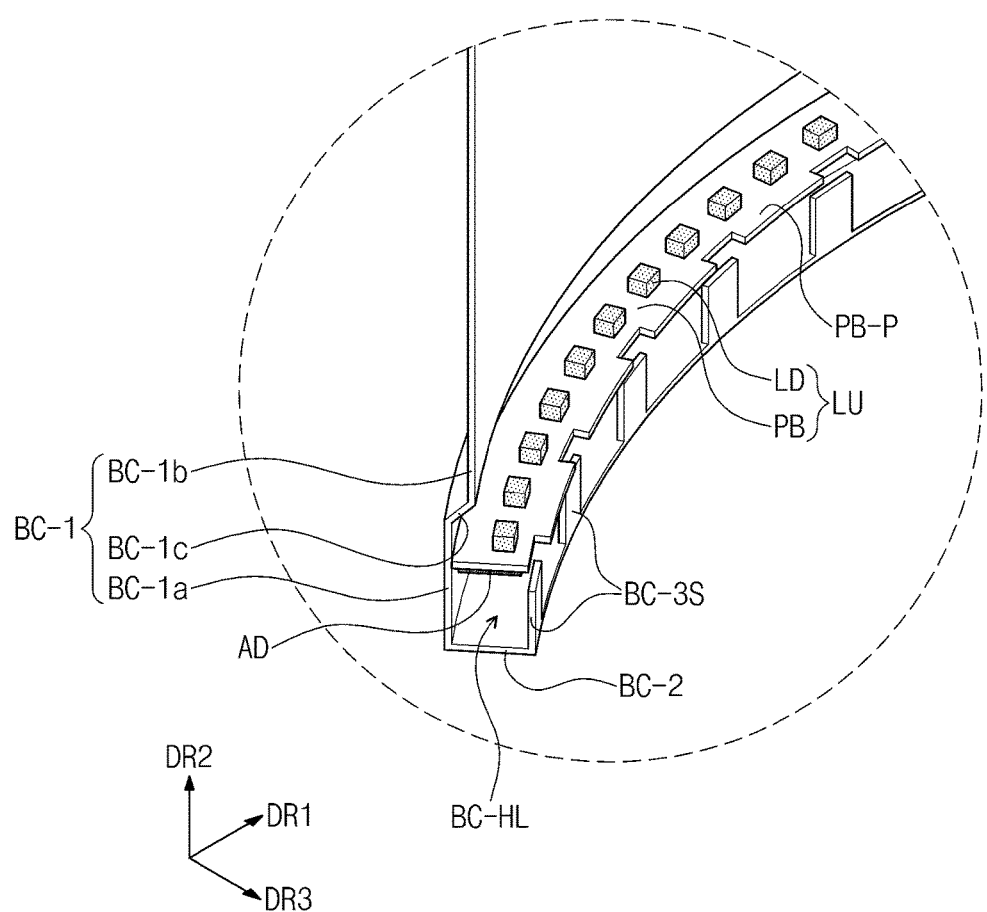
FIG. 9 is a perspective view showing an arrangement relation between a bottom cover and a light source part according to an alternative exemplary embodiment of the disclosure.

FIG. 9 is a perspective view showing the light source part LU disposed in the engaging space BC-HL of the bottom cover. Referring to FIG. 9, the light source part LU is disposed in the engaging space BC-HL of the bottom cover such that the protrusion portions PB-P of the printed circuit board are disposed in, e.g., inserted into, a space between the sub-ceiling portions BC-3S of the bottom cover.

In one exemplary embodiment, for example, each of the protrusion portions PB-P of the printed circuit board of the light source part is disposed to correspond to the space between the sub-ceiling portion BC-3S of the bottom cover, and thus the light source part LU is disposed in and fixed to the engaging space BC-HL of the bottom cover. Accordingly, the light source part may be easily assembled with the bottom cover by the protrusion portions PB-P of the printed circuit board. In such an embodiment, the protrusion portions PB-P may serve as a handle when the light source part is assembled.

Referring to FIG. 9, the light source part LU may further include an adhesive member AD disposed on a lower surface of the printed circuit board, and the light source part LU is attached to the bottom cover BC by the adhesive member AD.

Figure 10:
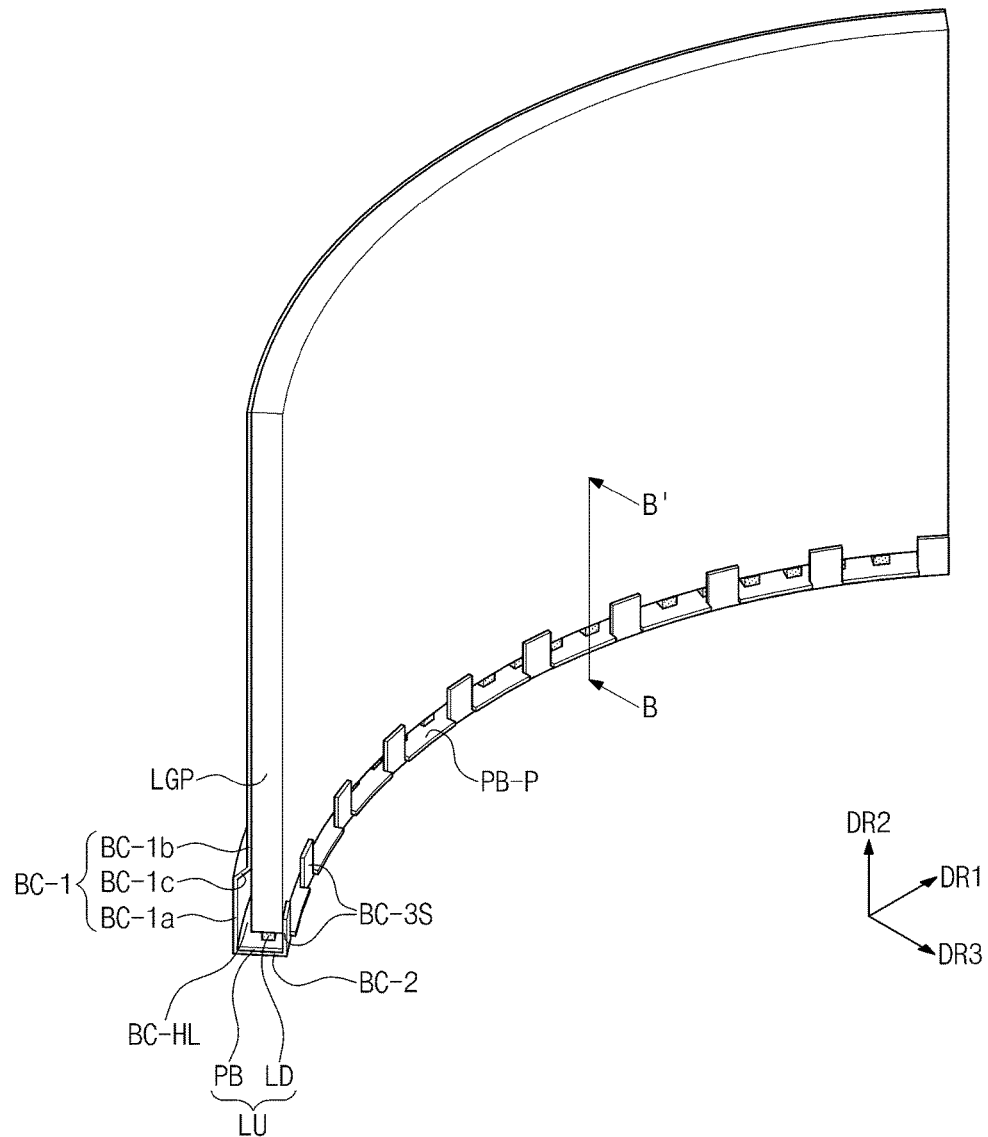
FIG. 10 is a perspective view showing a bottom cover in which a light source part and a light guide part are accommodated according to an exemplary embodiment of the disclosure.
Figure 11:
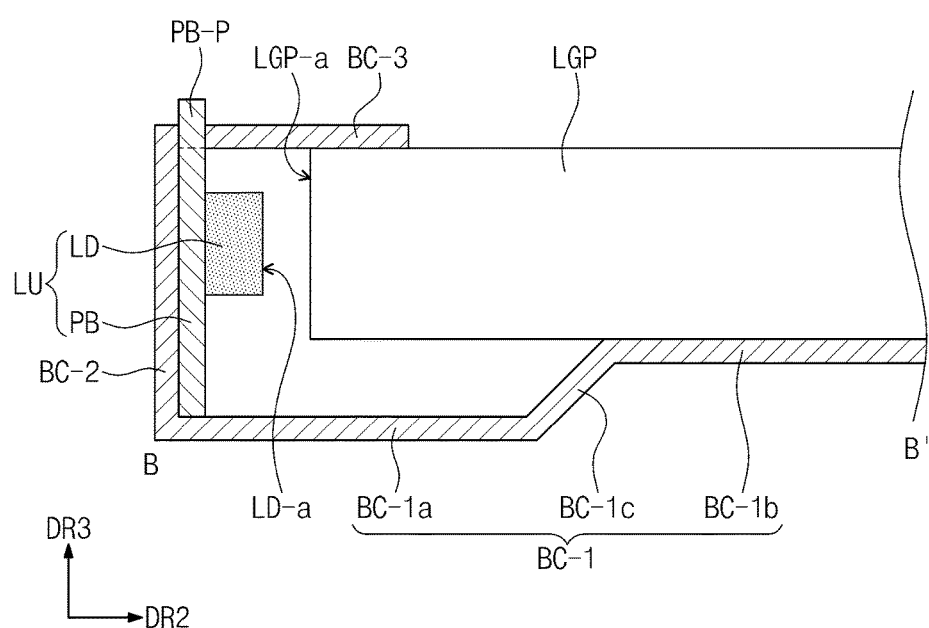
FIG. 11 is a cross-sectional view taken along line B-B' of FIG. 10.

FIG. 10 is a perspective view showing a light guide part LGP disposed in a bottom cover BC, and FIG. 11 is a cross-sectional view taken along line B-B' of FIG. 10.

Referring to FIG. 10, in an exemplary embodiment, one side portion of the light guide part LGP is disposed in, e.g., inserted into, the engaging space BC-HL of the bottom cover. In such an embodiment, the light guide part LGP is fixed to the disposed in and held in the engaging space BC-HL by the sub-ceiling portions BC-3S.

In such an embodiment, the light guide part LGP is disposed in, e.g., inserted into, the engaging space BC-HL defined by the first bottom portion BC-1a, the sidewall portion BC-2, and the sub-ceiling portions BC-3S.

The surface of the light guide part LGP, which faces the first bottom portion BC-1a of the bottom cover, is disposed to be spaced apart from the first bottom portion BC-1a of the bottom cover, and the surface of the light guide part LGP and the second bottom portion BC-1b are disposed adjacent to each other in the second bottom portion BC-1b of the bottom cover.

In an exemplary embodiment, as shown in FIGS. 10 and 11, the light incident surface LGP-a of the light guide part LGP extends in the first direction DR1, and the light emitting diodes LD are disposed to face the light incident surface LGP-a of the light guide part LGP.

Referring to FIG. 11, the protrusion portions PB-P of the printed circuit board PB are more protruded to the third direction DR3 than the sub-ceiling portion BC-3S of the bottom cover, but they should not be limited thereto or thereby. In one exemplary embodiment, for example, the protrusion portions PB-P of the printed circuit board PB are protruded from the printed circuit board PB to the third direction DR3, but the protrusion portions PB-P are disposed in a range corresponding to a thickness of the sub-ceiling portion BC-3S in the cross-sectional view shown in FIG. 11.

Figure 12A:
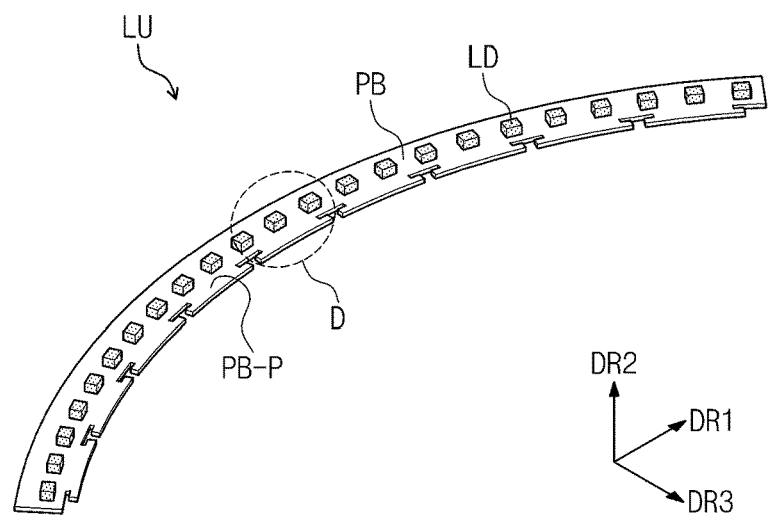
FIGS. 12A and 12B are a perspective view and a partially enlarged view, respectively, showing a light source part according to another alternative exemplary embodiment of the disclosure.
Figure 12B:
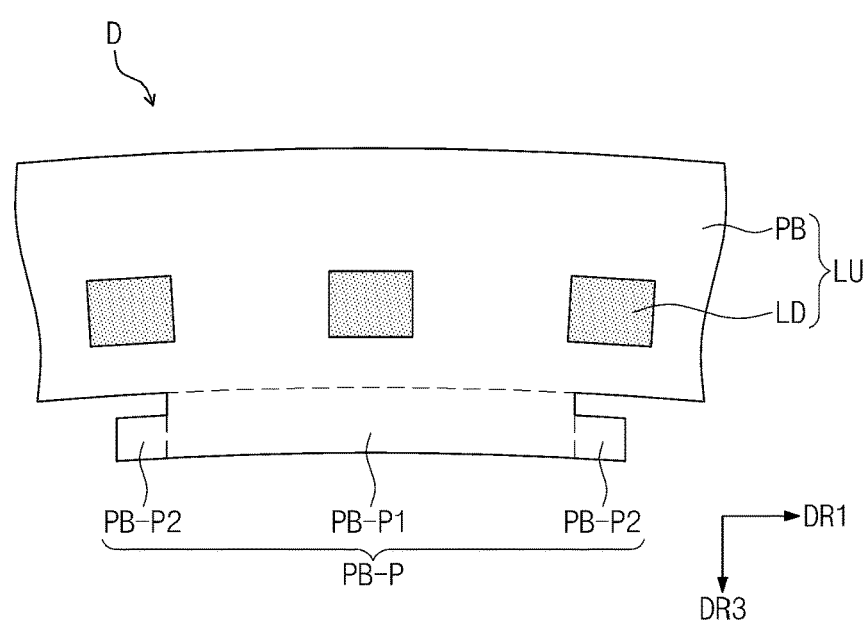

FIG. 12A is a perspective view showing a light source part according to another alternative exemplary embodiment of the disclosure, and FIG. 12B is an enlarged plan view showing a portion "D" of FIG. 12A.

Referring to FIG. 12A, in an exemplary embodiment, the light source part LU is curved in a first direction DR1 as the light source part described with reference to FIG. 3B or 8A.

In such an embodiment, a printed circuit board PB is curved in the first direction DR1 that is the same as the direction in which the display panel is curved and as the direction in which the bottom portion of the bottom cover is curved.

A plurality of light emitting diodes LD is disposed on the printed circuit board PB of the light source part LU and arranged in the first direction DR1 to be spaced apart from each other.

Referring to FIGS. 12A and 12B, the printed circuit board PB of the light source part LU includes a plurality of protrusion portions PB-P disposed at one side portion thereof. Each of the protrusion portions PB-P includes a first portion PB-P1 extending from the one side portion of the printed circuit board and a second portion PB-P2 extending from the first portion PB-P1 to the first direction DR1. The second portion PB-P2 extends in both opposite directions from the first portion PB-P1.

Figure 13A:
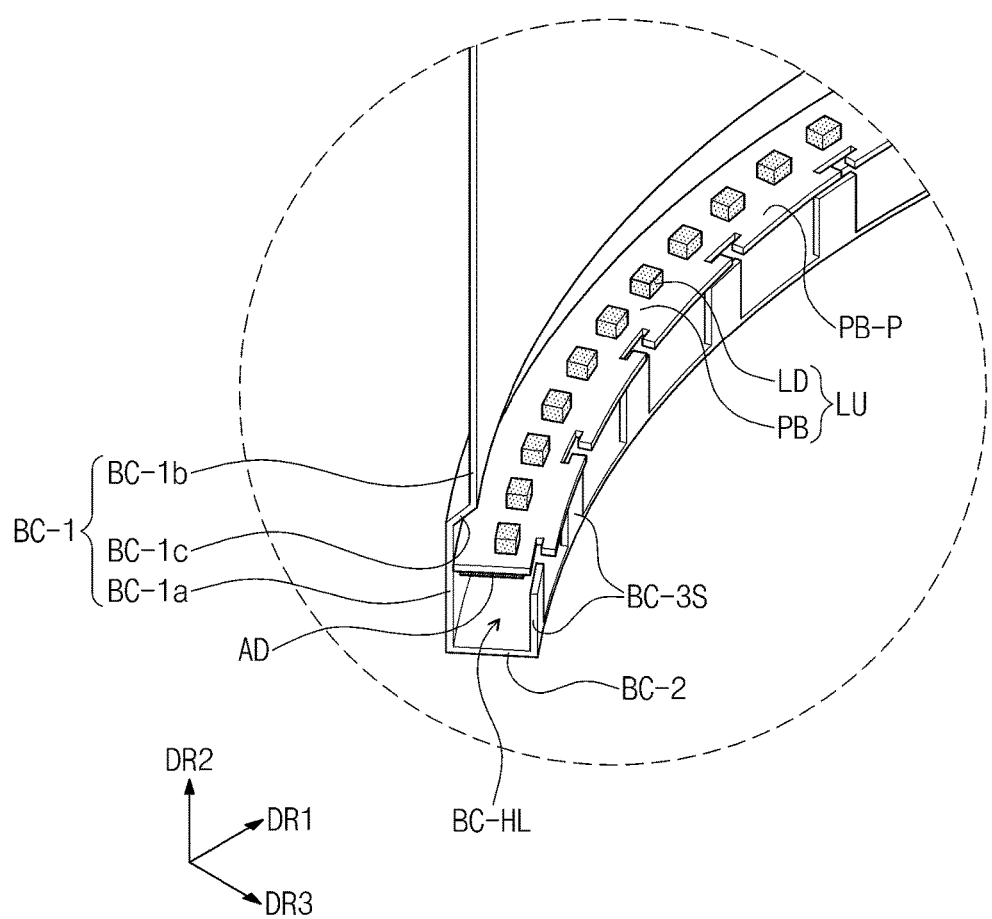
FIGS. 13A and 13B are perspective views showing a bottom cover in which a light source part and a light guide part are accommodated according to another alternative exemplary embodiment of the disclosure.
Figure 13B:
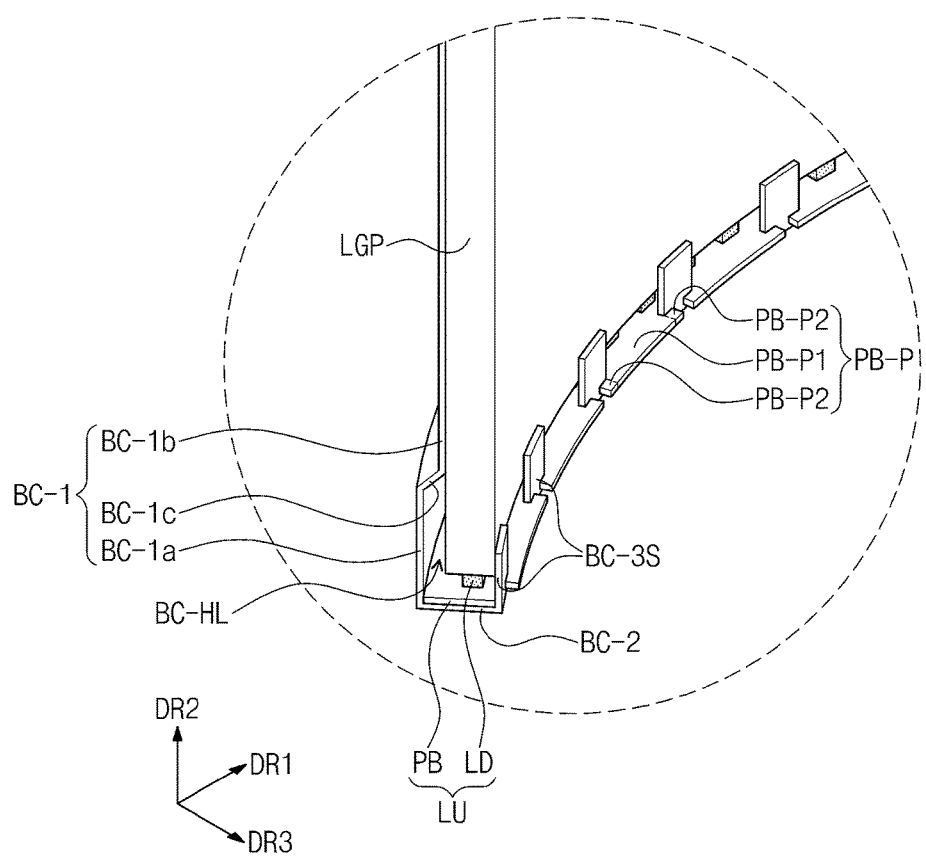

FIG. 13A is a perspective view showing the bottom cover in which the light source part shown in FIG. 12, and FIG. 13B is a perspective view showing a light guide part disposed in the bottom cover shown in FIG. 13A.

Referring to FIG. 13A, in an exemplary embodiment, the protrusion portions PB-P of the printed circuit board may be disposed in, e.g., inserted into, and held in spaces defined between the sub-ceiling portions BC-3S of the bottom cover. In such an embodiment, an adhesive member AD may be further disposed on a lower surface of the printed circuit board PB, which faces the sidewall portion BC-2 of the bottom cover.

Referring to FIG. 13B, the first portions PB-P1 of the protrusion portions PB-P of the light source part are disposed in the spaces between the sub-ceiling portions BC-3S of the bottom cover, respectively. In such an embodiment, the second portions PB-P2 of the protrusion portions of the printed circuit board extend from the first portions PB-P1 to the extension direction of the light incident surface and are disposed on the sub-ceiling portions BC-3S.

In one exemplary embodiment, for example, the second portions PB-P2 of the protrusion portions PB-P of the printed circuit board are disposed on the sub-ceiling portions BC-3S to be disposed in the engaging space of the bottom cover.

In an exemplary embodiment, as shown in FIG. 13B, the one side portion of the light guide part LGP and the light source part LU are disposed in, e.g., inserted into, the engaging space BC-HL. The engaging space BC-HL is surrounded by the first bottom portion BC-1a of the bottom cover, the sidewall portion BC-2, and the sub-ceiling portion BC-3S as shown in FIG. 13B.

The printed circuit board PB of the light source part is fixed to the sidewall portion BC-2 of the bottom cover and the second portions PB-P2 are disposed on the sub-ceiling portions BC-3S to allow the light source part LU to be disposed in the engaging space BC-HL.

In an exemplary embodiment, as described above, the protrusion portions of the light source part are disposed to correspond to the spaces between the sub-ceiling portions, respectively, such that the light source part and the light guide part are easily aligned with each other.

Figure 14:
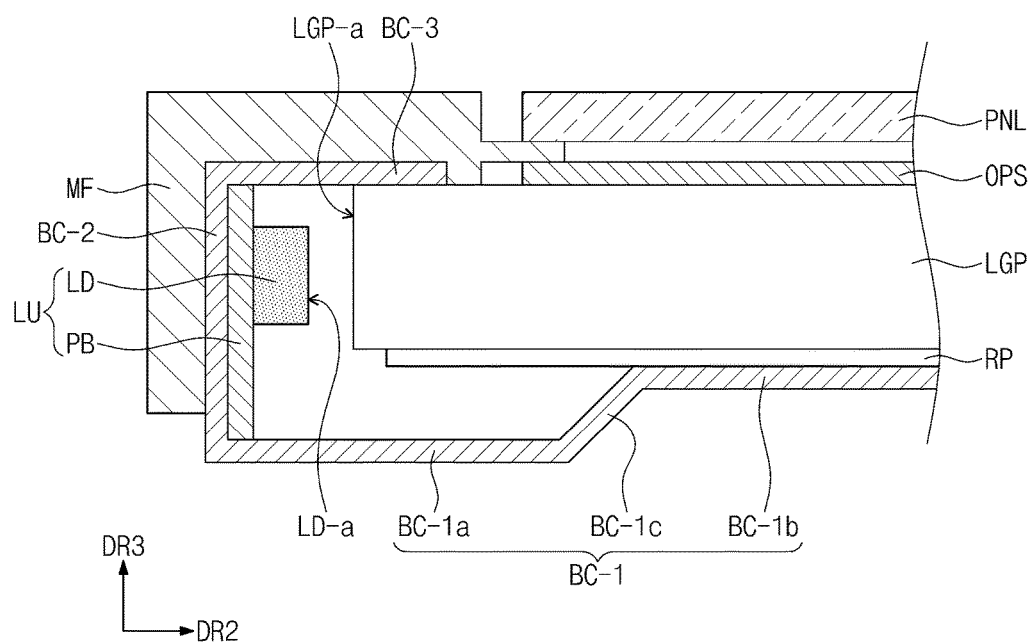
FIG. 14 is a cross-sectional view showing a display apparatus according to another alternative exemplary embodiment of the disclosure.

FIG. 14 is a cross-sectional view showing a display apparatus according to an exemplary embodiment of the disclosure.

In an exemplary embodiment, as shown in FIG. 14, the display apparatus may further includes a bottom cover in which the light guide plate LGP and the light source part LU are disposed and a mold frame MF disposed to surround the sidewall portion BC-2 and the ceiling portion BC-3.

The mold frame MF is disposed along an edge of the display panel PNL and disposed under the display panel PNL to support the display panel PNL. In such an embodiment, the mold frame MF holds the optical sheets OPS disposed under the display panel PNL.

The mold frame MF may include a fixing member, e.g., a locking jaw, to fix or support the display panel PNL, the optical sheets OPS, or a portion of the light guide plate LU.

The mold frame MF is disposed to correspond to four sides of the display panel PNL or at least a portion of the four sides of the display panel PNL. The mold frame MF may be provided in a single body, e.g., a single unitary and indivisible unit, or, alternatively, provided in plural portions.

The mold frame MF includes an organic material such as a polymer resin, but it should not be limited to the organic material.

Referring to FIG. 14, the mold frame MF covers the ceiling portion BC-3 of the bottom cover and a portion of the mold frame MF is disposed on the light guide part LGP. Although not shown in figures, the mold frame MF extends in a first direction DR1 in which the light incident surface LGP-a of the light guide part extends. Thus, the mold frame disposed on an upper surface of one side portion of the light guide part LGP may effectively prevent light from leaking toward the ceiling portion of the bottom cover except for the light guided to the display panel PNL.

The display panel PNL is disposed on the light guide part LGP and the light incident to the light guide plate LGP from the light source part LU is guided to the display panel PNL through the light guide part LGP. In such an embodiment, the optical sheets OPS may be disposed between the display panel PNL and the light guide part LGP. The optical sheets OPS include a prism sheet and a diffusion sheet.

The light guide part includes one surface facing the display panel PNL and the other surface facing the one surface and the display apparatus further includes a reflective part RP disposed to face the other surface of the light source part LGP. The reflective part RP is disposed between the light guide part LGP and the bottom portion of the bottom cover BC. The reflective part RP reflects the light incident thereto to the display panel PNL, and thus a light efficiency of the display apparatus is improved.

In an exemplary embodiment, as described above, the light guide part and the light source part are disposed in and fixed to the engaging space, such that the light guide part and the light source part may be easily aligned with each other. In such an embodiment, since the light guide part is held by the ceiling portion of the bottom cover, the shape of the light guide part curved along the curved surface of the bottom cover or the display panel may be maintained.

In an exemplary embodiment, the light guide part and the light source part are disposed in and held in the engaging space defined at the one side portion of the bottom cover, such that the light guide part and the light source part may be effectively prevented from being twisted under a working condition of high temperature and humidity.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a display panel comprising a display area with a curved surface;
a backlight assembly which provides light to the display panel; and
a bottom cover which accommodates the display panel and the backlight assembly,
wherein the bottom cover comprises:
a bottom portion;
a sidewall portion extending and bent from a side portion of the bottom portion; and
a ceiling portion extending and bent from the sidewall portion to face the bottom portion, wherein the bottom portion, the side portion and the ceiling portion are integrally formed as a single unitary and indivisible unit, wherein the backlight assembly comprises:
a light source part disposed in an engaging space defined by the bottom portion, the sidewall portion and the ceiling portion, and which emits the light; and
a light guide part which guides the light emitted from the light source part to the display panel,
wherein the ceiling portion comprises a plurality of sub-ceiling portions arranged in a direction, in which a light incident surface of the light guide plate extends, to be spaced apart from each other, and
wherein the printed circuit board comprises a plurality of protrusion portions, and
each of the protrusion portions is inserted into and arranged corresponding to a space defined between the sub-ceiling portions.

2. The display apparatus of claim 1, wherein
the light guide part comprises a light incident surface, to which the light is incident, at an end portion thereof, and
the end portion of the light guide plate is disposed in the engaging space.

3. The display apparatus of claim 1, wherein the bottom portion comprises:
a first bottom portion spaced apart from the ceiling portion by a first distance;
a second bottom portion spaced apart from an imaginary surface extending from the ceiling portion by a second distance; and
a third bottom portion disposed between the first bottom portion and the second bottom portion,
wherein the first distance is equal to or greater than the second distance.

4. The display apparatus of claim 3, wherein
the sidewall portion is bent from a side portion of the first bottom portion to a direction substantially vertical to the first bottom portion,
the ceiling portion is bent from the sidewall portion to face the first bottom portion, and
the engaging space is defined by the first bottom portion, the sidewall portion and the ceiling portion.

5. The display apparatus of claim 4, wherein the light guide part is disposed in the engaging space and spaced apart from the first bottom portion.

6. The display apparatus of claim 1, wherein the light source part comprises:
 a printed circuit board disposed on the sidewall portion to face a light incident surface of the light guide part; and
 a plurality of light emitting diodes disposed on the printed circuit board.

7. The display apparatus of claim 6, wherein the light emitting diodes are arranged in a direction in which the light incident surface extends.

8. The display apparatus of claim 6, wherein the printed circuit board has a shape curved in a direction in which the display panel is curved.

9. The display apparatus of claim 6, further comprising:
 an adhesive member disposed between the sidewall portion and the printed circuit board.

10. The display apparatus of claim 6, wherein
 each of the light emitting diodes comprises a light emitting surface from which the light is emitted, and
 the light emitting surface of each of the light emitting diodes is disposed to face the light incident surface.

11. The display apparatus of claim 1, wherein the bottom portion has a shape curved along the curved surface of the display panel.

12. The display apparatus of claim 1, wherein the sidewall portion is bent to a direction substantially vertical to the bottom portion.

13. The display apparatus of claim 1, wherein the protrusion portions comprise:
 a first portion disposed in the space between the sub-ceiling portions; and
 a second portion extending from the first portion to the extension direction of the light incident surface and disposed on the sub-ceiling portions.

* * * * *